(12) United States Patent
Hsu et al.

(10) Patent No.: US 8,035,600 B2
(45) Date of Patent: Oct. 11, 2011

(54) IMAGE CONTRAST CORRECTION SYSTEM AND METHOD THEREOF

(75) Inventors: Tien-Chu Hsu, Padeh (TW); Chih-Fan Su, Padeh (TW); Min-Shiy Wu, Padeh (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 1232 days.

(21) Appl. No.: 11/505,479

(22) Filed: Aug. 17, 2006

(65) Prior Publication Data
US 2007/0279349 A1    Dec. 6, 2007

(30) Foreign Application Priority Data
Jun. 5, 2006   (TW) ............................... 95119926 A

(51) Int. Cl.
*G09G 3/36*    (2006.01)

(52) U.S. Cl. ............................... 345/98; 345/87

(58) Field of Classification Search .................. 345/204, 345/690, 55–111
See application file for complete search history.

(56) References Cited

U.S. PATENT DOCUMENTS

| | | | |
|---|---|---|---|
| 5,296,919 A | 3/1994 | Maruno et al. | |
| 5,546,134 A | 8/1996 | Lee | |
| 5,796,384 A | 8/1998 | Kim et al. | |
| 5,859,633 A | 1/1999 | Kim et al. | |
| 5,862,254 A | 1/1999 | Kim et al. | |
| 5,937,090 A | 8/1999 | Kim | |
| 6,101,271 A | 8/2000 | Yamashita et al. | |
| 6,331,862 B1 | 12/2001 | Yamada et al. | |
| 6,680,733 B2 | 1/2004 | Woo et al. | |
| 6,731,259 B2 | 5/2004 | Yer et al. | |
| 6,798,368 B2 | 9/2004 | Jung et al. | |
| 6,984,666 B2 | 1/2006 | Jia et al. | |
| 7,164,787 B1 * | 1/2007 | Nevis et al. | 382/154 |
| 7,414,622 B2 * | 8/2008 | Abe et al. | 345/204 |
| 2005/0213814 A1 | 9/2005 | Lin | |
| 2006/0050084 A1 | 3/2006 | Jeffrey et al. | |
| 2006/0071936 A1 * | 4/2006 | Leyvi et al. | 345/589 |

FOREIGN PATENT DOCUMENTS

| | | |
|---|---|---|
| CN | 1717714 | 1/2006 |
| JP | 06-078245 A | 3/1994 |
| TW | M274600 | 9/2005 |

OTHER PUBLICATIONS

Article Titled "New real-time enhancement algorithm for infrared images" jointly authored by Wang et al., Ref. No. 1003-501X(2006)01-0046-04, Opto-Electronic Engineering, vol. 33, No. 1, Jan. 2006.
Article titled "Fuzzy Enhancement Algorithm Based on Histogram" authored by Zhao et al., Computer Engineering, vol. 31 No. 12, Jun. 2005 pp. 185-186, 220.
"Office Action of Taiwan Counterpart Application", issued on Jan. 27, 2011, p. 1-p. 8.

* cited by examiner

*Primary Examiner* — Nitin Patel
(74) *Attorney, Agent, or Firm* — Jianq Chyun IP Office

(57) ABSTRACT

An image contrast correct system and method thereof is provided. Exploiting Fuzzy theorem to analysis the image, which the LCD is going to display, identify the correction strength to several levels and real time correct the image contrast according to the Fuzzy rule and the Fuzzy decision theorem. On the other hand, all image analysis, correction decision, and the contrast correction will be completed during one frame period. Utilizing this FCC method (Fuzzy Contrast Correction) can avoid the over-correction or the under-correction situation, can improve or enhance the image contrast properly.

20 Claims, 8 Drawing Sheets

| adjustment function | | maximun pixel number | | | |
|---|---|---|---|---|---|
| | | H | M | L | N |
| difference with average value | H | H | H | M | N |
| | M | H | M | L | N |
| | L | H | M | M | L |
| | N | H | H | H | H |

FIG. 6

| suitable level function | | 1st uppermost peak | | | |
|---|---|---|---|---|---|
| | | H | M | L | N |
| 2nd uppermost peak | H | H | H | M | N |
| | M | H | M | L | N |
| | L | H | M | M | L |
| | N | H | H | H | H |

FIG. 7

IMAGE CONTRAST CORRECTION SYSTEM AND METHOD THEREOF

BACKGROUND OF THE INVENTION

1. Field of the Invention

The present invention generally relates to a method and system of image contrast correction, and more particularly relates to a method and system of liquid crystal display image contrast correction with Fuzzy theory.

2. Description of the Prior Art

Nowadays, Liquid Crystal Display (LCD) is a kind of monitor apparatus with lots of advantage, such as, light, low volume, low power consumption, low radiation, low glitter and can save more space. However, the LCD monitor has a major disadvantage on image display is low contrast. Low contrast cause the image quality of LCD can't contend against the vivid image quality displayed from the plasma display panel and the traditional CRT monitor. The root cause of low contrast is because the liquid crystal can not completely covers the backlight. As this result, light leakage phenomenon occurs when the LCD shows the black image. At the same time, when the white image doesn't have enough illumination neither due to low luminance, the contrast of LCD will become quite low. One of the prior arts to solve this problem is to analysis the input signal by cumulative distribution function (CDF). However, CDF needs about 1~2 frame time to calculate the data, it can not display the corrected image in real time and needs lots of electric storage apparatus to calculate the function.

One of the other prior arts to solve this problem is modifying the driver voltage of source driver IC to force gray scale shows brighter or darker image. This method doesn't need extra production cost and won't occupy the hardware space. However, part of response speed of the digital to analog converter (DAC) of external hardware circuit may limit the resolution of the image and DAC has large power consumption also.

The contrast of LCD determines the image quality, said, how to make LCD has better color quality by correct the image within finite luminance is a big issue.

SUMMARY OF THE INVENTION

Accordingly, it is an object of the present invention to provides a method and a system of liquid crystal display image contrast correction with Fuzzy theory, exploiting the Fuzzy theory to analysis the image that LCD is going to display and determine the contrast correction strength by Fuzzy rules.

Another object of the present invention is to provides a method and a system of liquid crystal display image contrast correction with Fuzzy theory, exploiting the Fuzzy theory to determine whether the image needs contrast correction or not. If the contrast of the image needs to be corrected, then decides the correction strength. Thus, it can improve the situation that all images are using the same, uniform correction strength to correct the image contrast.

Another object of the present invention is to provides a method and a system of liquid crystal display image contrast correction with Fuzzy theory, exploiting the Fuzzy theory and analysis, identify the correction strength to several levels. It may avoid the image over-correction or under-correction situation occur, improves the image contrast properly, makes the LCD image color more vivid and increase the product competitively.

Another object of the present invention is to provide a method and a system of liquid crystal display image contrast correction with Fuzzy theory. According to the image luminance distribution histogram, separate the image into two portions, one is dark and one is bright. Then, exploiting the Fuzzy theory to decide the contrast correction function let the LCD monitor keeps the image average brightness level but has better image display quality.

Another object of the present invention is to provide a method and a system of liquid crystal display image contrast correction with Fuzzy theory, analysis the whole image, decide the correction strength and correct the image color in one frame time. This method can save calculate process time and can correct the image contrast in real time to compensate the LCD low contrast congenital deficiency.

Another object of the present invention is to provide a method and a system of liquid crystal display image contrast correction with Fuzzy theory, process the Fuzzy theory and Fuzzy decision during the frame blanking time, the corrected image can be displayed to the LCD when the next image comes in. As this result, it achieves the goal to real time correct the image.

Another object of the present invention is to provide a method and a system of liquid crystal display image contrast correction with Fuzzy theory, correct the image by exponential correction. The exponential correction can maintain the original image characteristics, contour, can avoid the distortion situation when corrects the dark or the bright image.

Another object of the present invention is to provide a method and a system of liquid crystal display image contrast correction with Fuzzy theory, create an contrast correction function that relevant to current image by real time Fuzzy theory and Fuzzy decision.

So as to accomplish the above object, there are provided a method and a system of liquid crystal display image contrast correction with Fuzzy theory, exploiting a Fuzzy unit to Fuzzification the image data, then decide the correction strength according to the Fuzzy rule, collocate the contrast correction function to achieve the goal of real time image correction.

BRIEF DESCRIPTION OF THE DRAWINGS

The foregoing aspects becomes better understood by reference to the following drawings, wherein:

FIG. 6 is a rule table of first Fuzzification in accordance with a preferred embodiment of the present invention;

FIG. 7 is a rule table of second Fuzzification in accordance with a preferred embodiment of the present invention.

DESCRIPTION OF THE PREFERRED EMBODIMENT

There is shown a method and a system of image contrast correction according to one preferred embodiment of the present invention.

Figure 1:
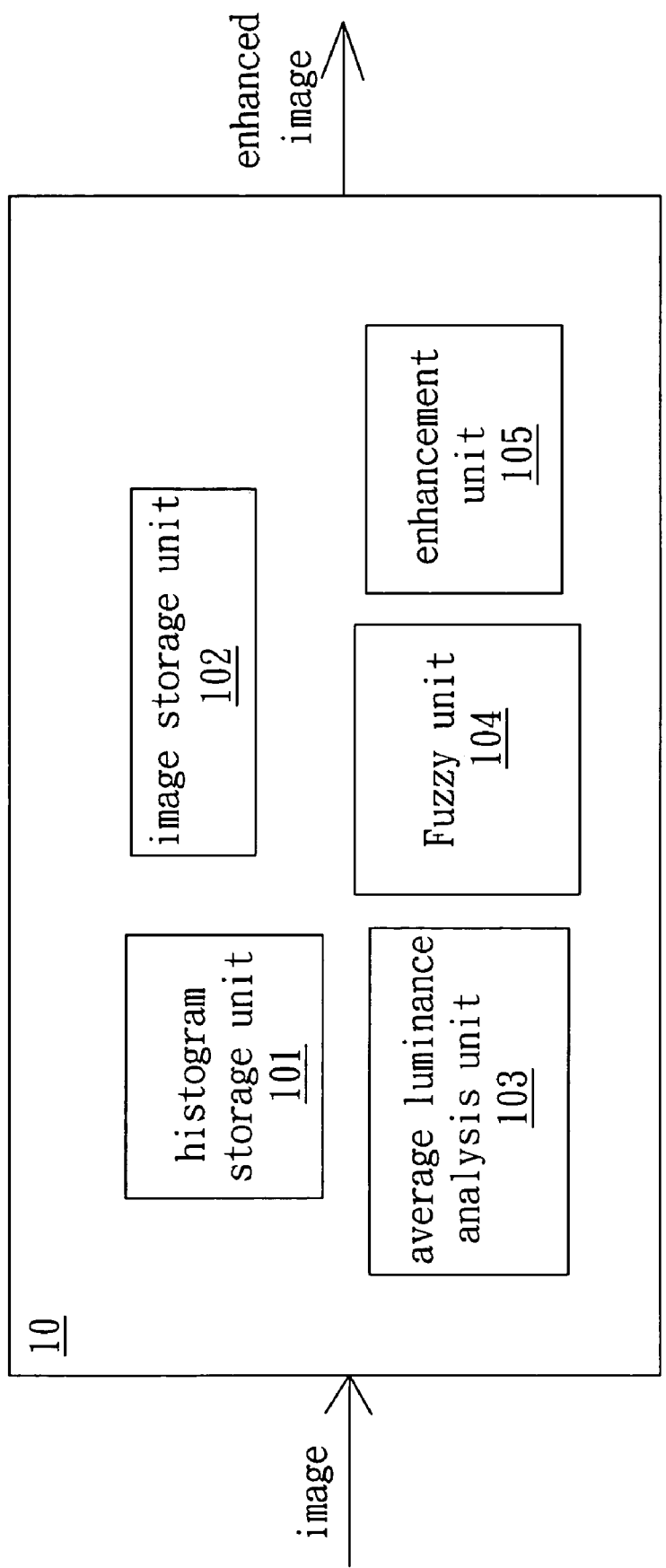
FIG. 1 is a schematic illustrates the Fuzzy Correction System hardware block in accordance with a preferred embodiment of the present invention.

Referring to FIG. 1, illustrating the Fuzzy Correction system hardware block in accordance with a preferred embodiment of the present invention. The Fuzzy correction system 10 includes an average luminance analysis unit 103, used to analysis input image and save the image luminance distribution information and image into a histogram storage unit 101 and a image storage unit 102 respectively. While the image input, analysis, storage completed, a Fuzzy unit 104 start to analysis the image with Fuzzy theory and then decides the proper correction strength of the image. After the Fuzzy unit 104 decided the correction strength, the enhancement unit 105 will read the image from the image storage unit 102 and corrects the image contrast with a contrast correction function which decided by the Fuzzy unit 104. And then display the corrected image on the LCD panel. Besides, the average luminance analysis unit 103, histogram storage unit 101, image storage unit 102, Fuzzy unit 104, and the enhancement unit 105 may be combined as a Fuzzy image contrast correction programmable IC. As this result, the image contrast correction system will not increase the size of the LCD.

Figure 2:
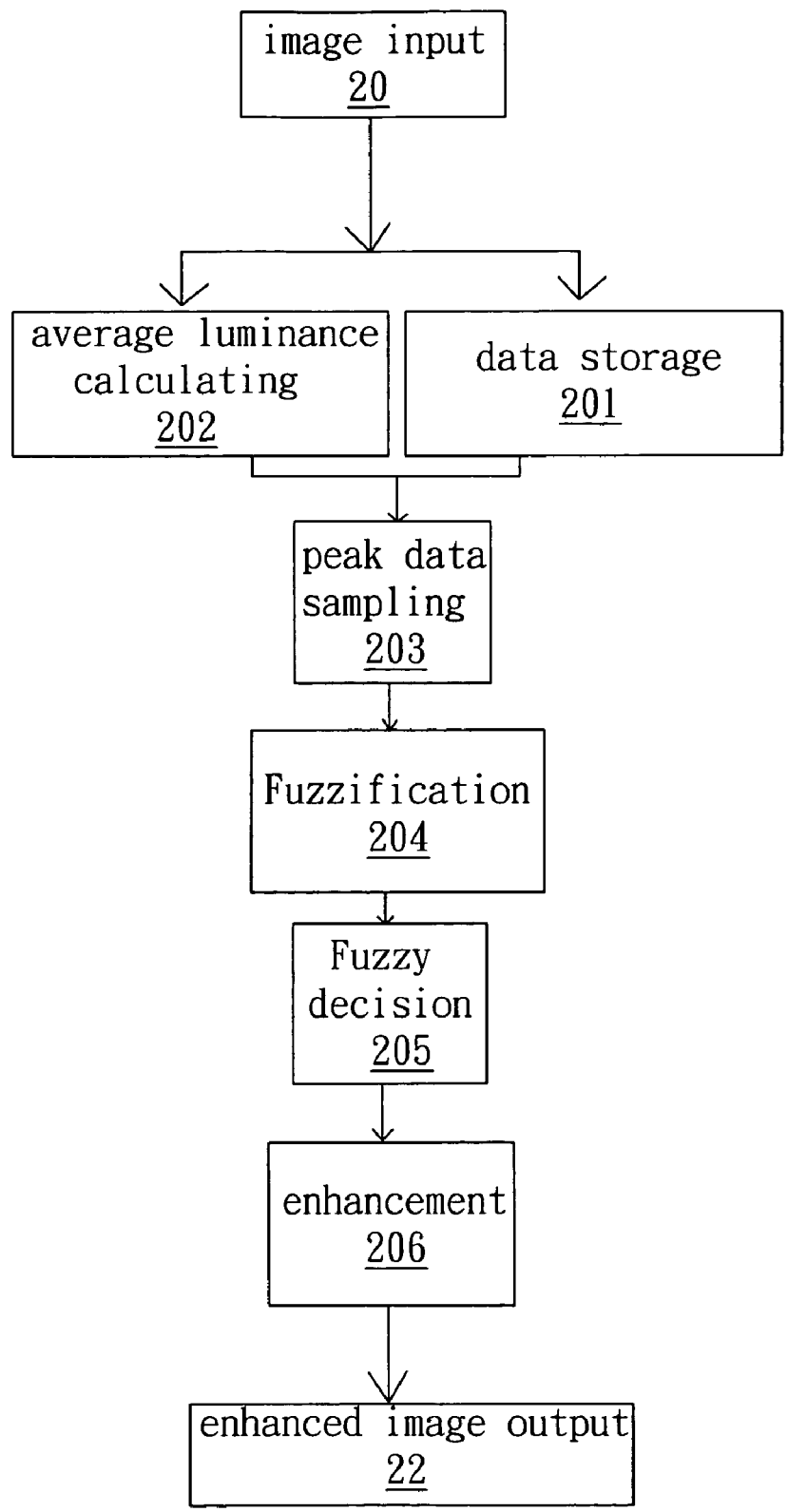
FIG. 2 is a flow chart in accordance with a preferred embodiment of the present invention.

Referring to FIG. 2 is a flow chart in accordance with a preferred embodiment of the present invention. After the image input through from a input panel (step 20), start to analysis the image data to dig out the average gray scale value of the whole image within the input image data, and create an image luminance distribution histogram of the input image (step 202). Next, saves the image luminance distribution histogram and the input image respectively (step 201). After the image input (step 20), analysis (step 202), save (step 201) completed, starts to sample the image luminance distribution histogram and to grab peak value of the major gray scale distribution (step 203). Then Fuzzification the peak value and the average gray scale to a Fuzzy set (step 204), exploiting loop up Fuzzy rule to determine the image correction strength (step 205). Wait until the image correction strength decided, to correct the image luminance, enhance the image contrast (step 206) via a contrast correction function and output the corrected image to LCD panel (step 22).

Figure 3:
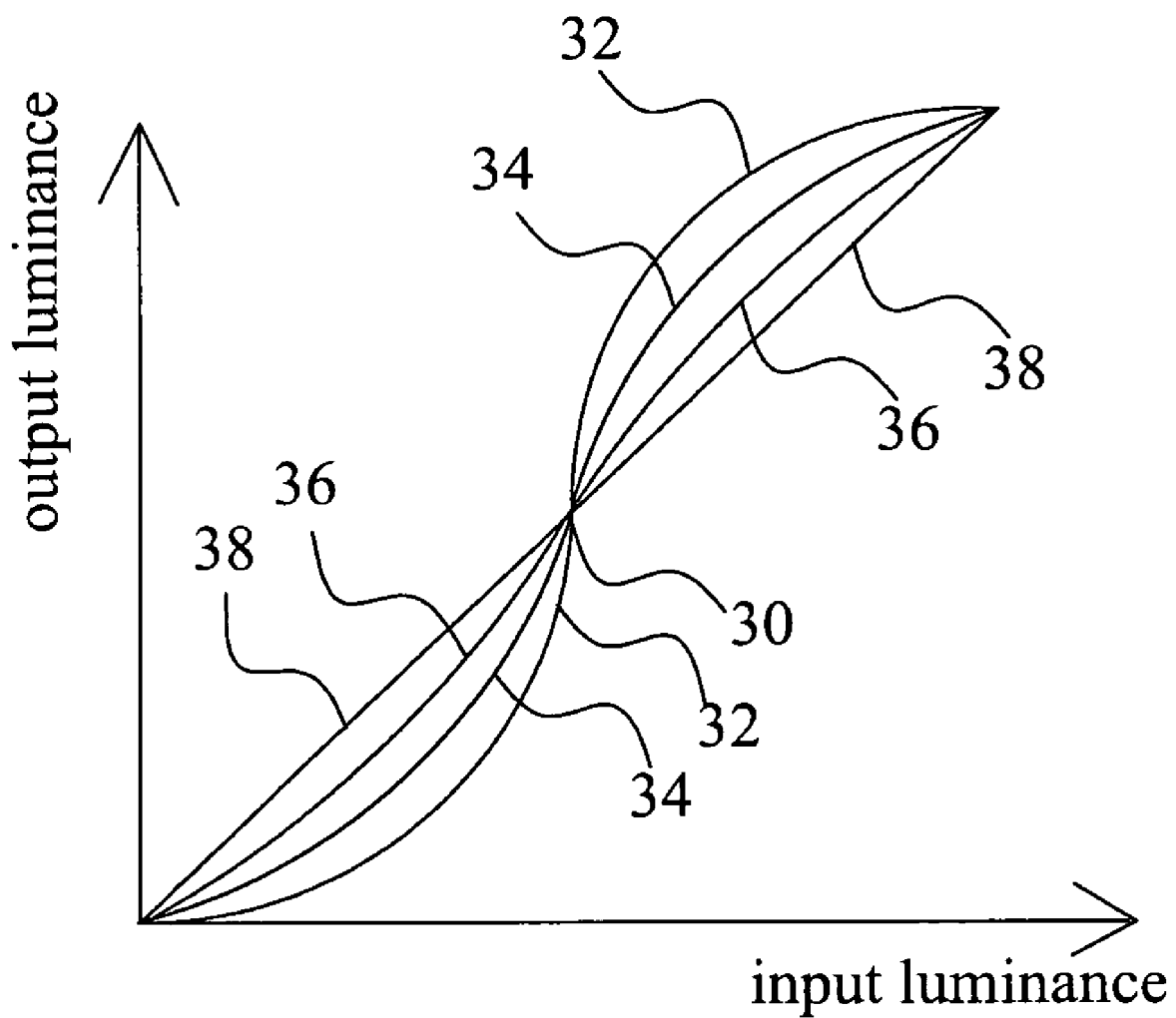
FIG. 3 is a contrast correction function diagram in accordance with a preferred embodiment of the present invention.

There is a contrast correction function base be saved in an electric storage apparatus (i.e., Read-Only Memory or Random-Access Memory). The enhancement unit will correct the image depends on one contrast correction function of the contrast correction function base. After the Fuzzy unit processes the Fuzzy theory and Fuzzy decision analysis completed, the Fuzzy unit will search a proper contrast correction function from the pre-saved contrast correction function base, which is saved in the electric storage apparatus, to correct any possible image. Please referring to FIG. 3, is a contrast correction function diagram in accordance with a preferred embodiment of the present invention. The contrast correction function that was pre-saved in the contrast correction function base uses input luminance as x-axis and uses corrected luminance as y-axis to draw as four contrast correction curves. There are: H contrast correction curve 32, M contrast correction curve 34, L contrast correction curve 36, and N contrast correction curve 38 respectively. The correct strength from strong to weak in order is: H contrast correction curve 32>M contrast correction curve 34>L contrast correction curve 36>N contrast correction curve 38. In other words, if one image needs H contrast correction curve 32 to correct it, that means this image doesn't have enough contrast rate. For example, one image has most of luminance distributes on the dark status and the Fuzzy unit decides this image needs to be corrected by the H contrast correction curve 32, that means, the dark portion of this image doesn't need to be corrected. Just the image luminance higher than the luminance average value 30 portion need to be corrected via the upper side of H contrast correction curve (the right side curve of the luminance average value 30), to modify the image which does not bright enough to brighter and enlarge the contrast between dark portion and bright portion. Besides, the contrast correction function is an exponential function, exploiting the exponential correction can maintain the original image characteristics, contour, and can avoid the distortion situation when corrects the dark or the bright image.

Figure 4:
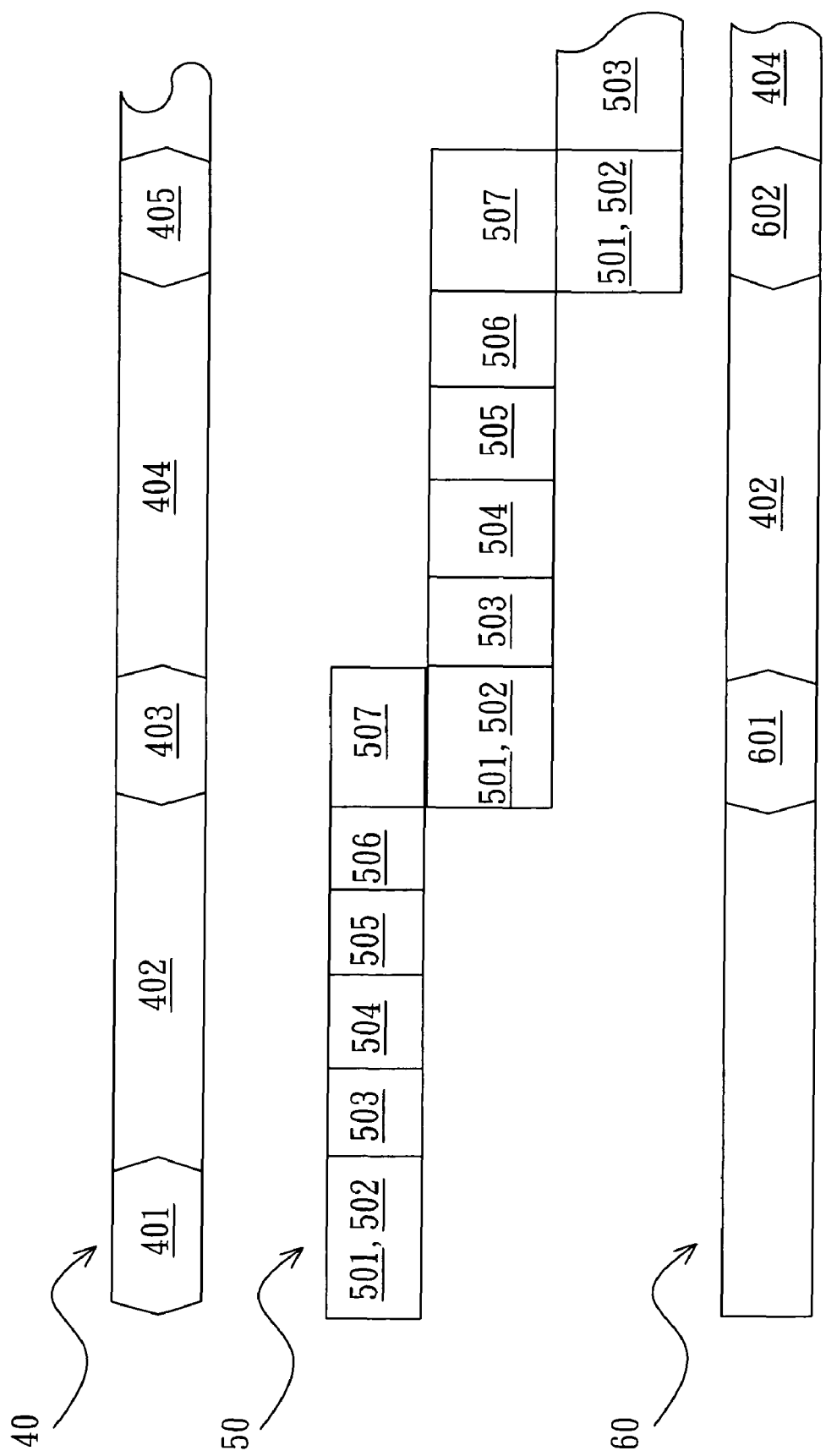
FIG. 4 is a timing flow chart in accordance with a preferred embodiment of the present invention.

Referring to FIG. 4, is a timing flow chart in accordance with a preferred embodiment of the present invention. The image input flow 40 is going to input the image of the first frame, the image of the second frame, the image of the third image . . . in order (timing 401, timing 403, timing 405 . . . etc.). In the same time, the pipeline process flow 50 and the image output flow 60 are processing simultaneous. For example, during the image of the first frame input period (timing 401), the timing pipeline process flow 50 starts to analysis the image average luminance (timing 502) and saving the image luminance distribution histogram (timing 501). After the image of the first frame input (timing 401) complete, the LCD panel will process a frame blanking action in order to display the image of the second frame (timing 403). Next, when image input flow 40 processing the frame blanking action to clear the image of the first frame (timing 402), the pipeline process flow 50 sampling the luminance peak value (timing 503), fuzzification (timing 504), Fuzzy decision (timing 505) and enhance the contrast of the image (timing 506) at the same time. Due to the frame blanking action of LCD needs spend around 3000 clocks to clear the previous image, however, the process time of the hardware system of the present invention just needs 500 clocks to deal with the plurality of image analysis (timing 503, 504>, decision (timing 505), enhancement (timing 506) action. Thus, while the image of the second frame sent in (timing 403), the corrected image of the first frame will be outputted (timing 507) at the same time. The image output flow 60 will display the corrected image of the first frame to the LCD panel (timing 601). Understandable, when image input flow processing the frame blanking action of the second frame (timing 404), the system is processing all the analysis and decision of the image of the second frame (timing 503, 504,505 and 506) before outputs the corrected image. Since the image of the third frame sent in (timing 405), the pipeline process flow 50 outputs the corrected image of the second frame (timing 507) and the image output flow 60 displays the corrected image of the second frame to the LCD panel (timing 602) at the same time. Exploiting this multitask mode to display whole corrected images.

Figure 5A:
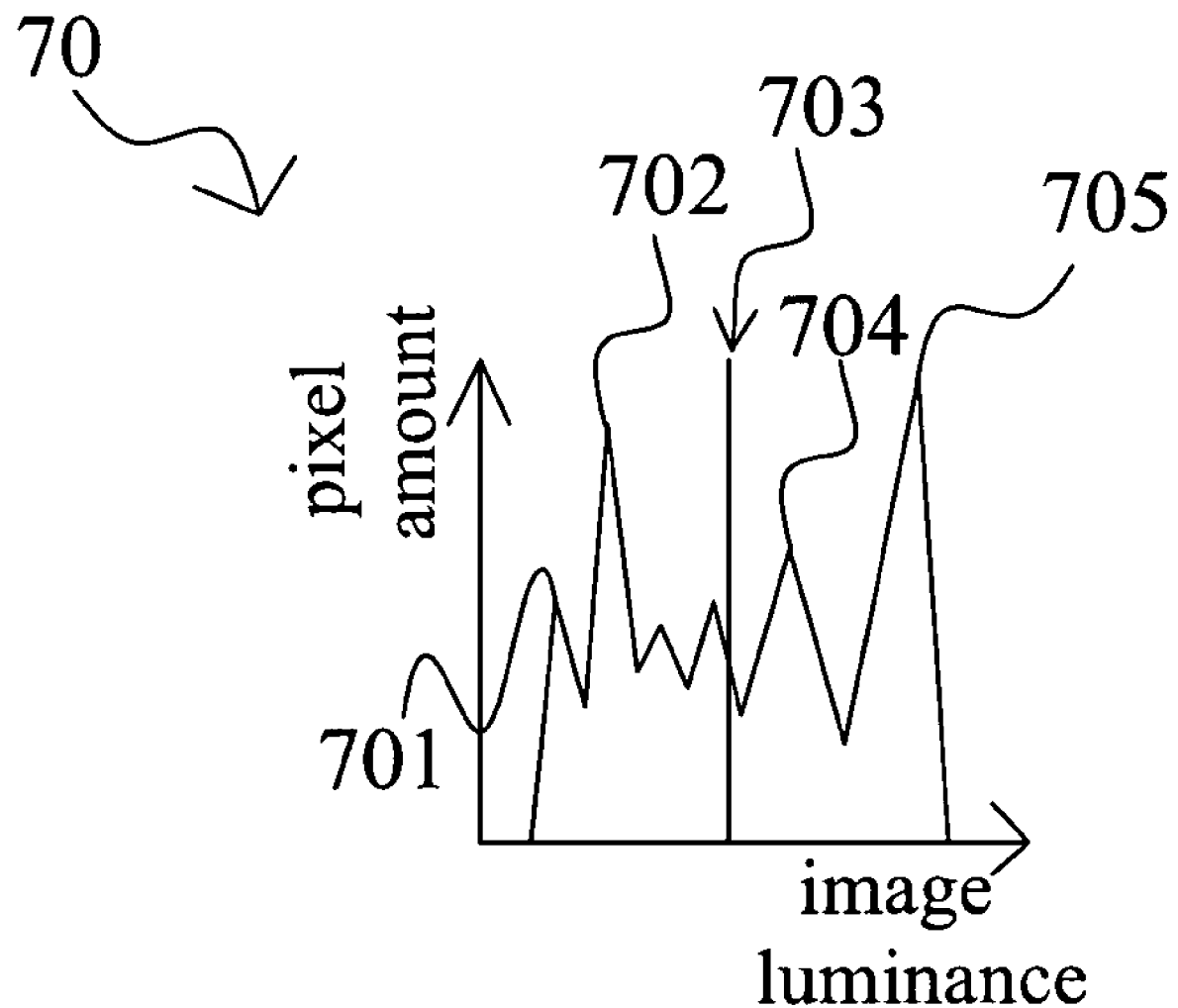
FIG. 5A is an image luminance distribution histogram in accordance with a preferred embodiment of the present invention.
Figure 5B:
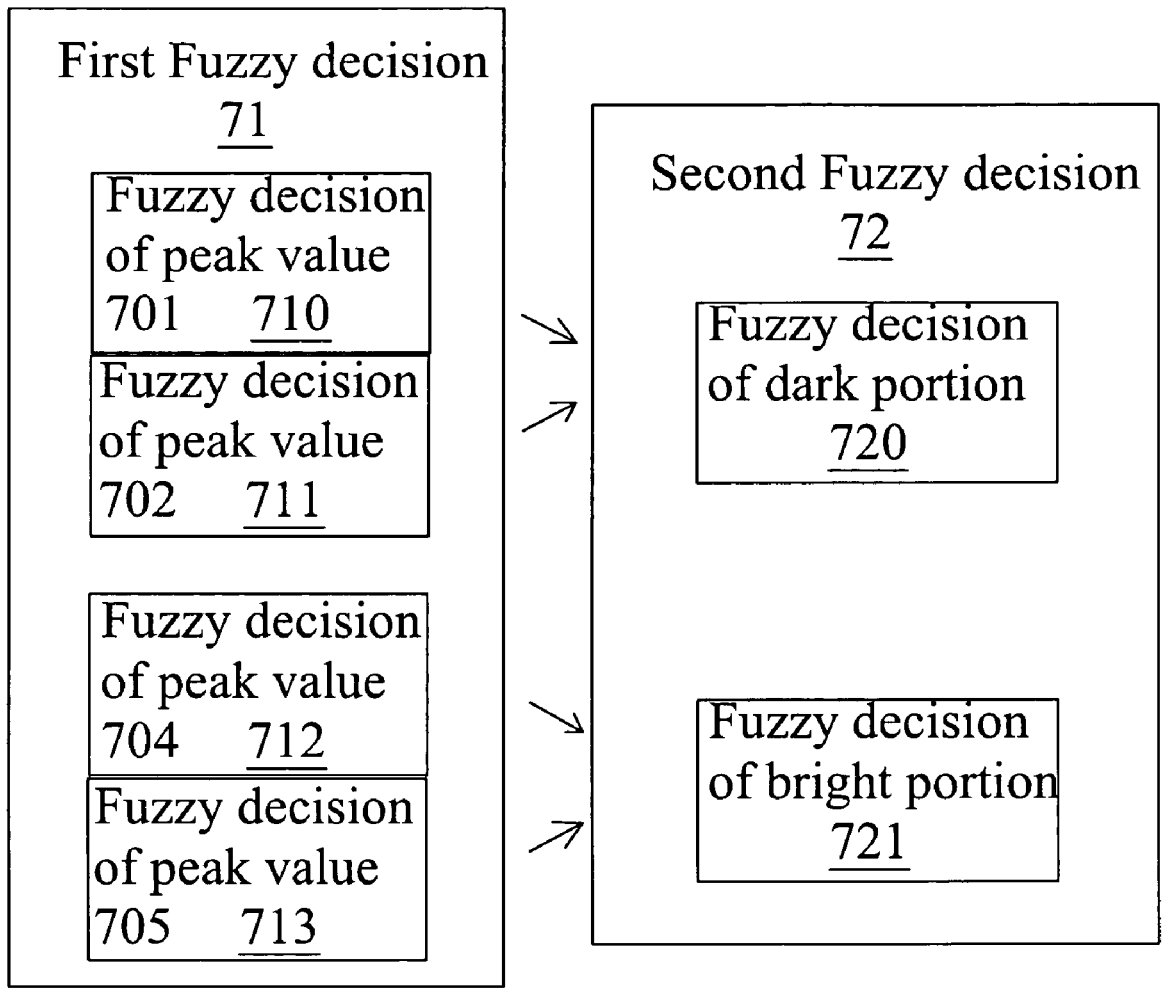
FIG. 5B is a diagram illustrates the Fuzzy decision analysis flow with an image luminance distribution histogram in accordance with a preferred embodiment of the present invention.

Please referring to FIG. 5A and FIG. 5B, they are the diagrams illustrating the image luminance distribution histogram and the Fuzzy decision analysis flow in accordance with a preferred embodiment of the present invention. In this embodiment, the image luminance distribution is be drafted as an image luminance distribution histogram 70 with image luminance and pixel amount as coordinates. Exploiting the Fuzzy theory and Fuzzy decision and depends on the major peak value and the major peak value location of the image luminance distribution histogram 70 to determine the contrast correction strength. Grab two major peak values (peak value 704, peak value 705) from the higher side of the image luminance distribution histogram 70 based on the average luminance 703 and other two major peak values (peak value 701, peak value 702) from the lower side of the image luminance distribution histogram 70 based on the average luminance 703. Then Fuzzification these four peak values 701, 702, 704, and 705, and process the first Fuzzy decision 71 (the first Fuzzy decision 710 of peak value 701, the first Fuzzy decision 711 of peak value 702, the first Fuzzy decision 712 of peak value 704, and the first Fuzzy decision 713 of peak value 705) depends on the first Fuzzy decision table (please referring to FIG. 6, is a rule table of the first Fuzzification in accordance with a preferred embodiment of the present invention) to get a first Fuzzy correction value. Next, after the first Fuzzy decision 71 is completed, process the second Fuzzy decision 72 (Fuzzy decision of dark portion 720 and Fuzzy decision of bright portion 721) to determine the dark portion contrast correction strength and the bright portion contrast correction strength respectively. Then take the contrast correction strength result of Fuzzy decision of dark portion 720 and the contrast correction strength result of Fuzzy decision of bright portion 721 to figure out an proper contrast correction function base on look up the second Fuzzy decision table (please referring to FIG. 7, is a rule table of second fuzzification in accordance with a preferred embodiment of the present invention). In other words, it is to separate the image to two portions: one is dark and the other is bright, and exploiting the Fuzzy theory to analysis and decide the contrast correction function to keep the image average luminance but has better display quality.

Figure 8:
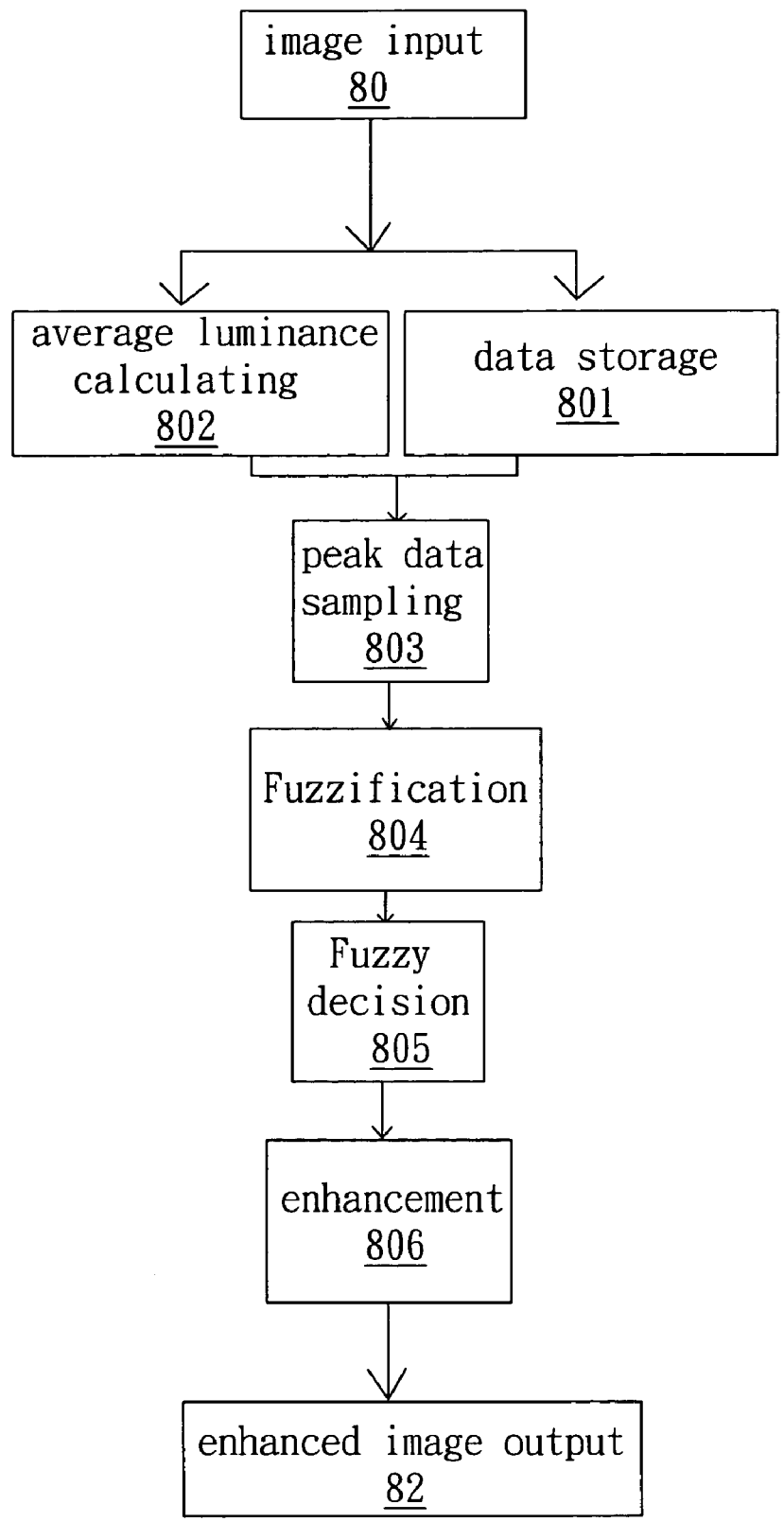
FIG. 8 is a flow chart in accordance with a different embodiment of the present invention.

Referring to FIG. 8, is a flow chart in accordance with a different embodiment of the present invention. After the image input through from an input panel (step 80), the image data is analyzed to dig out the average gray scale of the whole image within the input image data, and create an image luminance distribution histogram of the input image (step 802). Next, the image luminance distribution histogram and the input image are saved, respectively (step 801). After the image input (step 80), analysis (step 802), save (step 801) completed, start to sample the image luminance distribution histogram and to grab peak value of the major gray scale distribution (step 803). Then the peak value and the average gray scale are processed with a Fuzzy method to a Fuzzy set (step 804), exploiting Fuzzy number (Triangular Fuzzy Number, Non-Symmetric Fuzzy Number, Trapezoidal Fuzzy Number, Bell Shape Fuzzy Number . . . etc) and collocating with Fuzzy theory to decide a contrast correction function (step 805). Wait until the image correction strength decided, correct the image luminance, enhance the image contrast (step 806) by the contrast correction function and output the corrected image to LCD panel (step 82).

Although the present invention has been explained by the embodiments shown in the drawings described above, it should be understood to the ordinary skilled person in the art that the invention is not limited to the embodiments, but rather that various changes or modification thereof are possible without departing from the spirit of the invention. Accordingly, the scope of the invention shall be determined only by the appended claims and their equivalents.

What is claimed is:

1. A method of image contrast correction, comprising:
analyzing an image to create an image luminance distribution histogram of said image and save said image luminance distribution histogram and said image;
sampling said image luminance distribution histogram to obtain major peak values of said image luminance distribution histogram;
processing the major peak values of said image luminance distribution histogram based on a first Fuzzy rule table to decide a first Fuzzy correction value, processing respectively a bright portion of said image and a dark portion of said image to decide a bright portion contrast correction strength and a dark portion contrast correction strength based on a second Fuzzy rule table and deciding a contrast correction function of said image according to said bright portion contrast correction strength, said dark portion contrast correction strength and said second Fuzzy rule table;
enhancing said image with said contrast correction function to generate a corrected image; and
outputting said luminance corrected image.

2. The method of image contrast correction according to claim 1 is an image contrast correction method for a display apparatus.

3. The method of image contrast correction according to claim 2, wherein said display apparatus is a liquid crystal display apparatus.

4. The method of image contrast correction according to claim 1, wherein said analyzing step is used to figure out the whole average gray scale from said image.

5. The method of image contrast correction according to claim 1, wherein said processing step further exploits a fuzzy number and collocates with fuzzy theory to calculate said contrast correction function for said image.

6. The method of image contrast correction according to claim 5, wherein said Fuzzy number is any one of the Triangular Fuzzy number, Non-symmetric Fuzzy Number, Trapezoidal Fuzzy Number or Bell Shape Fuzzy Number.

7. The method of image contrast correction according to claim 1, wherein said contrast correction function is exponential format.

8. The method of image contrast correction according to claim 1, wherein said processing step and said enhancing step are implemented during a frame blanking time of said liquid crystal display apparatus.

9. The method of image contrast correction according to claim 8, wherein the total implement time of said processing step and said enhancing step is less than said frame blanking time of said LCD.

10. The method of image contrast correction according to claim 1, wherein said outputting step is implemented as the same time as said analyzing step of the next image.

11. A system of image contrast correction, comprising:
an image input unit, to input an image through an input terminal;
a Fuzzy correction system configured for analyzing an image to generate an image luminance distribution histogram of said image, sampling said image luminance distribution histogram to obtain major peak values of said image luminance distribution histogram, processing the major peak values of said image luminance distribution histogram based on a first Fuzzy rule table to decide a first Fuzzy correction value, processing respectively a bright portion of said image and a dark portion of said image to decide a bright portion contrast correction strength and a dark portion contrast correction strength based on a second Fuzzy rule table, deciding a contrast correction function of said image according to said bright portion contrast correction strength, said dark portion contrast correction strength and said second Fuzzy rule table, and correct the contrast of said image; and an image output unit to output said corrected image to a liquid crystal display.

12. The system of image contrast correction according to claim 11 is applicable on a display apparatus.

13. The system of image contrast correction according to claim 12, wherein said display apparatus is a liquid crystal display apparatus.

14. The system of image contrast correction according to claim 11, wherein said Fuzzy correction system includes an average luminance analysis unit, a histogram storage unit, an image storage unit, a Fuzzy unit, and an enhancement unit.

15. The system of image contrast correction according to claim 14, wherein said Fuzzy correction system combines said average luminance analysis unit, said histogram storage unit, said image storage unit, said Fuzzy unit, and said enhancement unit as programmable integrated circuit.

16. The system of image contrast correction according to claim 14, wherein said average luminance analysis unit provides said image and related information to said histogram storage unit, said image storage unit and said Fuzzy unit.

17. The system of image contrast correction according to claim 14, wherein said Fuzzy correction system further comprising an electric storage apparatus to save at least one contrast correction function to correct the contrast of said image.

18. The system of image contrast correction according to claim 17, wherein said electric storage apparatus is random access memory or read only memory.

19. The system of image contrast correction according to claim 11, wherein said Fuzzy correction system comprising a Fuzzy decision table to decide said contrast correction function of said image.

20. The system of image contrast correction according to claim 11, wherein said Fuzzy correction system comprising a Fuzzy number to get said contrast correction function of said image by collocating with Fuzzy theory.

* * * * *